United States Patent
Keith

[11] 3,946,784
[45] Mar. 30, 1976

[54] TIRE WITH WIDE LATERALLY OFFSET TREAD

[76] Inventor: Robert J. Keith, 65 Devonshire, Great Falls, Mont. 59405

[22] Filed: June 11, 1974

[21] Appl. No.: 478,772

[52] U.S. Cl. ........... 152/352 R; 152/353 R; 152/185
[51] Int. Cl.² ......................................... B60C 5/00
[58] Field of Search ............ 152/209 R, 209 A, 352, 152/353, 185

[56] References Cited
UNITED STATES PATENTS

| | | | |
|---|---|---|---|
| 2,240,855 | 5/1941 | Phillips | 152/353 |
| 2,281,359 | 4/1942 | Kennet | 152/352 |
| 3,554,259 | 1/1971 | Webb | 152/209 A |
| R18,638 | 10/1932 | Michelin | 152/352 |

FOREIGN PATENTS OR APPLICATIONS

| | | | |
|---|---|---|---|
| 19,063 | 9/1909 | United Kingdom | 152/209 R |
| 755,990 | 8/1956 | United Kingdom | 152/209 R |
| 1,480,905 | 3/1969 | Germany | 152/352 |

Primary Examiner—Drayton E. Hoffman
Assistant Examiner—H. Grant Skaggs
Attorney, Agent, or Firm—Clarence A. O'Brien; Harvey B. Jacobson

[57] ABSTRACT

In the case of a retreading operation a conventional symmetrical tire casing is prepared for retreading by buffing the outer peripheral or crown portion of the casing and the outer peripheral portions of both side wall portions of the casing adjoining the crown portion are also buffed. In addition, one side wall portion of the casing is buffed to a point closely adjacent the bead portion thereof and the buffed portions of the tire casing then have cement applied thereto in a conventional manner prior to the application of a retread rubber strip or strips to the cemented portions of the buffed tire casing. Thereafter, the tire casing, with the retread rubber applied thereto is cured in the usual manner. The retread rubber overlying the one fully buffed side wall of the tire casing is generally radially straight and the other side of the retread rubber applied to the buffed outer peripheral portions of the other side wall of the tire casing is generally flush with the area of maximum width of that side wall of the casing, whereby the outer peripheral surface of the retreaded tire casing is generally twice the width of the crown portion of the casing. Further, the outer peripheral surface of the retreaded tire casing is generally cylindrical and thereby appreciably widens the ground contact area of the retreaded tire casing distributing the load of the vehicle portion supported therefrom over a greater area to thus reduce wear of the retreaded tire casing per unit of area of tread surface. In the case of new tire construction, a symmetrical tire casing is constructed in the usual manner and generally the same configuration of side wall and tread rubber is cured thereon in order to produce a wide laterally offset tread surface and an outer side wall which has a thicker covering of rubber than the inner side wall.

2 Claims, 5 Drawing Figures

TIRE WITH WIDE LATERALLY OFFSET TREAD

BACKGROUND OF THE INVENTION

Conventional vehicular pneumatic tires are utilized on some types of underground mining and construction equipment. Although such conventional tires provide reasonable service they are subject to considerably more abrasive wear due to the environments in which they are used.

In the case of mining equipment special over-sized tires may not be used due to side clearances of underground mining equipment to which they are applied being appreciably increased. In addition, the outer side wall portions of pneumatic tires used in underground mining operations are subject to excessive abrasive wear and are often caused to wear out or fail prematurely long before the tread portion is completely worn.

Accordingly, a need exists for a pneumatic tire constructed in a manner to provide a greater tread surface contact area and additional protection against abrasion and cuts in the outer side wall portions thereof.

BRIEF DESCRIPTION OF THE INVENTION

The instant invention resides in the retreading or provision of a conventional symmetrical tire casing with the side wall and tread rubber thereon being such that the outer side wall portion thereof, in addition to the crown portion of the tire casing, is covered by a reasonably thick layer of rubber with the outer surface of the outer side wall of the tire being generally radially straight so as to provide a substantially double width tread portion. Of course, inasmuch as necessary steering movements of steerable wheels of undeground mining equipment and adjacent undercarriage portions of such equipment restrict the associated tires or tire casings from being increased in width inwardly, the increased width of the tire casing of the present invention is provided at the outside wall portion of the tire casing resulting in the transverse center of the outer tread portion of a tire constructed or retreaded in accordance with the present invention being laterally offset outwardly from the center of the symmetrical tire casing.

In addition to the extra thickness layer of rubber extending over the outer surface of the outside side wall portion of the tire casing to thus provide additional resistance against wear and cuts on the outside side wall of the tire casing, the extra thickness layer of rubber provided on the outside side wall casing adjacent the bead portion of the casing establishes a rim guard to protect the outside rim of the associated wheel against damage by contact with hard rocks or mine tunnel wall portions.

The main object of this invention is to provide an improved pneumatic tire casing construction designed specifically for use in the construction and underground mining industry and thus for use on slow speed vehicles having a need for additional outside side wall protection, outside wheel rim protection and additional tread surface ground contact.

Another object of this invention, in accordance with the immediately preceding object, is to provide a tire construction which may be formed by generally conventional retreading operations and generally conventional new tire construction operations.

A final object of this invention to be specifically enumerated herein is to provide a tire casing construction in accordance with the preceding objects and which will conform to conventional forms of manufacture, be of simple construction and durable in use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 3:
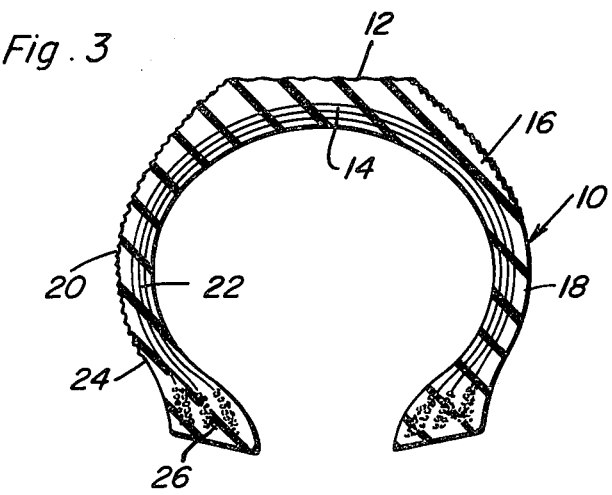
FIG. 3 is a cross-sectional view illustrating the manner in which a conventional vehicular tire casing is buffed preparatory to the retreading operation.
Figure 4:
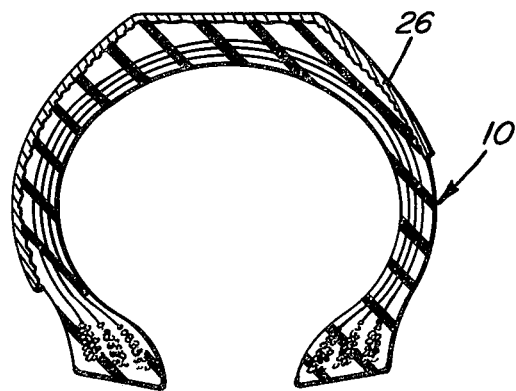
FIG. 4 is a sectional view illustrating the manner in which the buffed portions of the tire casing have cement applied thereto preparatory to applying the retread rubber to the tire casing.
Figure 5:
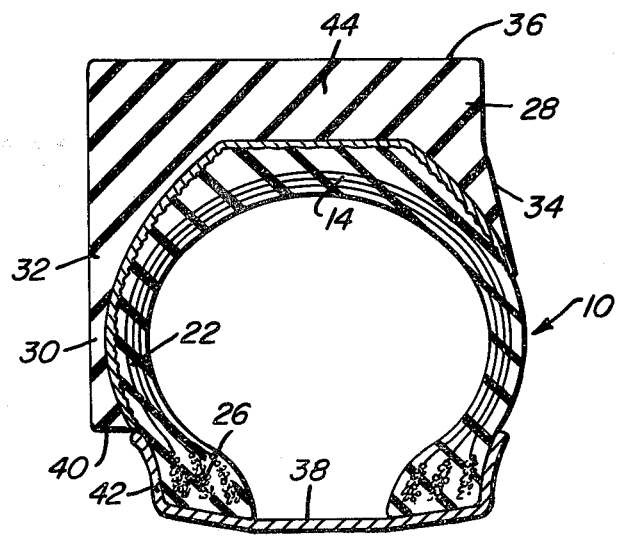
FIG. 5 is a sectional view similar to FIG. 2 but with the retreaded tire applied to a wheel rim construction and including a single piece of retread rubber cured thereon.

Referring now more specifically to the drawings and to FIGS. 3, 4 and 5 in particular, the numeral 10 generally designates a conventional form of tire casing. In FIG. 3 the tire casing has had the outer surface 12 of the crown portion 14 thereof buffed and the outer peripheral portion 16 of the inner side wall 18 of the tire casing also buffed. Further, the outer surface 20 of the outside side wall 22 of the tire casing 10 has been substantially fully buffed inwardly to a point 24 closely adjacent the outside side wall bead portion 26.

As may be seen from FIG. 4 of the drawings the buffed portions or surfaces 12, 16 and 20 of the tire casing 10 then have a layer of cement 27 applied thereto and thereafter a preformed strip 28 of retread rubber is applied to the cemented buffed surfaces of the tire casing 10 in the manner illustrated in FIG. 5 after which the retreaded tire is cured in the conventional manner.

From FIG. 5 of the drawings it may be seen that the strip 28 includes a thick portion 30 which overlies the outside side wall 22 of the casing 10 and that the outside surface 32 of the strip 28 is substantially radially straight. Further, the inside surface 34 of the strip 28 is generally radially straight and the outer peripheral tread surface 36 of the strip 28 is cylindrical and almost doubled in width over the width of the conventional tread area.

The tire casing 10 is illustrated in FIG. 5 as applied to a wheel rim 38 and it will be noted that the thick outside portion 30 of the strip 28 overlying the outside side wall 32 of the casing 10 not only provides an additional layer of rubber on the outside side wall portion 22 to protect against abrasion and cuts but also forms a shoulder 40 immediately radially outwardly of the outside bead retaining flange 42 of the wheel rim 38 to thereby protect the bead retaining flange 42 against abrasion and contact with rocks and mine passageway side walls.

Inasmuch as the retreaded tire casing is designed for slow speed operation the increased thickness of the tread portion 44 disposed outwardly of the crown portion 14 of the casing 10 does not cause excessive heat buildup during use of the tire. Additionally, flexure of the thickened portion 30 overlying the outside side wall 22 of the casing 10 does not cause excessive heat buildup due to the slow speed of rotation of the retreaded tire when in use.

Further, because the extra double width of the tread surface 36 is disposed primarily on the outer side of the casing 10, the transverse center of the tread surface 36 is laterally offset outwardly relative to the transverse center of the crown portion 14 of the tire casing 10.

Figure 2:
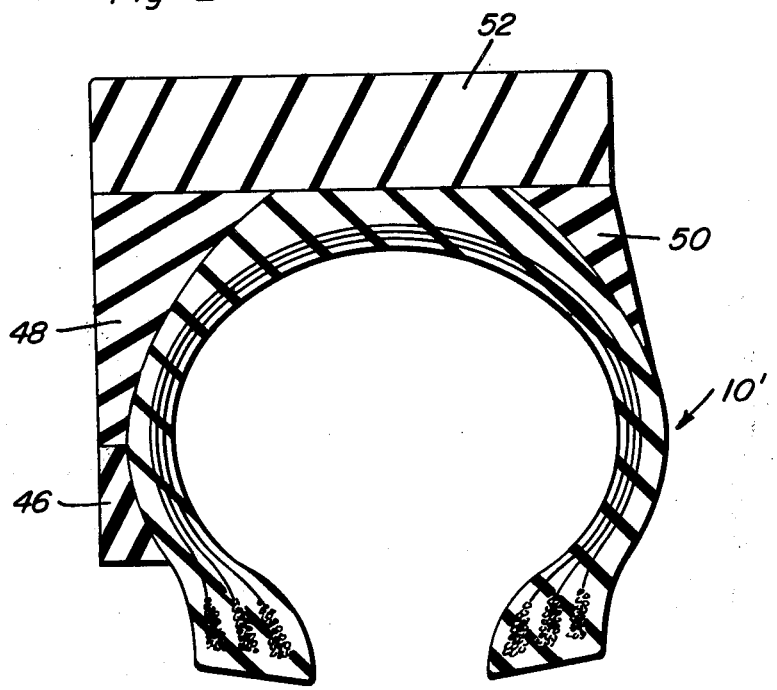
FIG. 2 is a cross-sectional view similar to FIG. 1 but illustrating a tire casing retreaded in accordance with the present invention.

With attention now invited more specifically to FIG. 2 of the drawings there will be seen a second tire casing retreaded in accordance with the present invention and generally referred to by the reference numeral 10'. The tire casing 10' is prepared for retreading in the same manner as the tire casing 10 illustrated in FIGS. 3 and 4. However, when the tire casing is of too large a diameter for the single tread strip 36 to be properly handled, the equivalent of the tread strip 28 is applied to the casing 10' in four different strips 46, 48, 50 and 52. The strips 46 and 48 together comprise the equivalent of the outer thickened portion 30 of the tread strip 36, the strip 50 comprises that portion of the tread strip 36 defining the inside side surface 34 of the tread strip 28 and the strip 52 is last applied and defines the equivalent of the tread portion 44 of the tread strip 36.

Although the retreading operation illustrated in FIG. 2 utilizes four different retreading strips 46, 48, 50 and 52 the end result, after the tire casing 10' has been cured in the conventional manner results in substantially the same structure as the retreaded tire casing 10.

Figure 1:
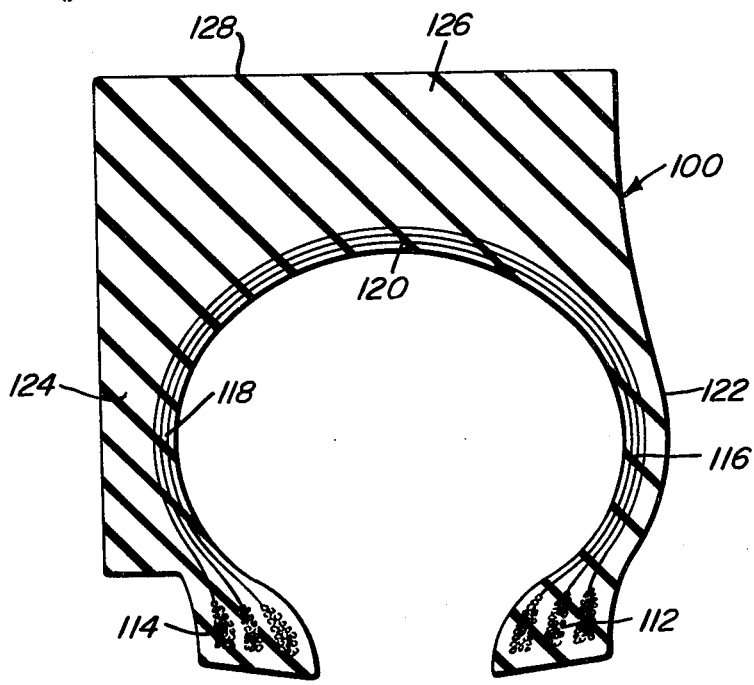
FIG. 1 is a cross-sectional view of one peripheral portion of a new tire constructed in accordance with the present invention.

In FIG. 1 of the drawings there may be seen a new tire 100 constructed in accordance with the present invention. The tire 100 includes the usual symmetrical casing defining bead portions 112 and 114 and inner and outer side wall portions 116 and 118 interconnected along their corresponding outer peripheral portions by means of an integral casing crown portion 120. The inner side wall portion 116 of the casing is provided with the usual thickness cover portion 122 of rubber, but the outer side wall portion 118 is provided with a considerably thicker cover portion 124 of rubber. The cover portion 124, from a point spaced slightly radially outwardly of the bead portion 114, is substantially radially straight as opposed to the at least slightly inwardly curving portion of the outer periphery of the cover portion 124 disposed outwardly of the zone of maximum axial thickness of the casing. The outer peripheral portions of the side wall cover portions 122 and 124 are interconnected by means of an integral radially thicker than usual crown or tread portion layer 126 of rubber including a cylindrical outer surface 128 thereby defining a wide tread surface which is of an axial width greater than the maximum axial thickness of the casing as defined by the radial mid-portions of the side wall portions 116 and 118 exclusive of the cover portions 122 and 124. Accordingly, the end result of the tire 100 constructed in accordance with the present invention is substantially the same from a structural and operational standpoint as the retreaded tire casings 10 and 10'.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tire construction for use on underground mining equipment subject to considerable abrasive wear due to the environment in which they are used and wherein regular oversized tires cannot be used because of clearances of the mechanical linkages underneath the vehicle and between the wheels and yet the outerside tire walls are subject to much greater wear than the tread portion, including a basic symmetrical casing structure of the type including a pair of outwardly arched annular side wall portions interconnected at their outer peripheral portions by means of an integral outwardly arched generally cylindrical crown portion extending therebetween, and a tread strip extending about said casing, said tread strip including opposite side annular portions and an outer connecting portion connecting the outer peripheries of said opposite side annular portions, said opposite side annular portions overlying and adhered to said side wall portions completely along the annular casing without any gaps and said connecting portion overlying and adhered to said crown portion, one of said side annular portions extending inwardly to a point disposed radially outwardly of the zone of maximum width of said casing and the other side annular portions extending inwardly past the zone of maximum width of said casing and including a thick portion thereof overlying the outer surface of the corresponding casing side wall and approximately as thick again as the regular casing structure for protecting the outer side of the casing from cuts and abrasive wear, the outer side face of said other side annular portion extending generally radially outwardly to the outer surface of said connecting portion, whereby the center zone of said connecting portion is laterally offset from the center plane of said casing toward said other side annular portion.

2. The combination of claim 1 wherein the inner peripheral portions of said side walls of said casing define bead portions adapted to sealingly seat against the inner surface of the bead retaining flanges on an underground mining equipment wheel, said one side annular portion inner peripheral portion being spaced only slightly outwardly of the corresponding bead portion so that the tire will not interfere with the mechanical linkage of the underground mining equipment.

* * * * *